No. 845,292. PATENTED FEB. 26, 1907.
J. G. CALLAN.
GOVERNING MECHANISM FOR TURBINES.
APPLICATION FILED SEPT. 1, 1905.

Witnesses:

Inventor,
John G. Callan,
By
Att'y.

No. 845,292. PATENTED FEB. 26, 1907.
J. G. CALLAN.
GOVERNING MECHANISM FOR TURBINES.
APPLICATION FILED SEPT. 1, 1905.

Witnesses:

Inventor,
John G. Callan.
By Albert G. Davis
Att'y.

No. 845,292. PATENTED FEB. 26, 1907.
J. G. CALLAN.
GOVERNING MECHANISM FOR TURBINES.
APPLICATION FILED SEPT. 1, 1905.

Witnesses:

Inventor,
John G. Callan,
By Albert G. Davis
Att'y.

No. 845,292. PATENTED FEB. 26, 1907.
J. G. CALLAN.
GOVERNING MECHANISM FOR TURBINES.
APPLICATION FILED SEPT. 1, 1905.

Witnesses:

Inventor
John G. Callan
By Attʼy.

No. 845,292. PATENTED FEB. 26, 1907.
J. G. CALLAN.
GOVERNING MECHANISM FOR TURBINES.
APPLICATION FILED SEPT. 1, 1905.

Inventor
John G. Callan
By Albert G. Davis
Att'y.

Witnesses:

No. 845,292. PATENTED FEB. 26, 1907.
J. G. CALLAN.
GOVERNING MECHANISM FOR TURBINES.
APPLICATION FILED SEPT. 1, 1905.

Witnesses:

Inventor,
John G. Callan,
By Albert H. Davis
Att'y.

UNITED STATES PATENT OFFICE.

JOHN G. CALLAN, OF LYNN, MASSACHUSETTS, ASSIGNOR TO GENERAL ELECTRIC COMPANY, A CORPORATION OF NEW YORK.

GOVERNING MECHANISM FOR TURBINES.

No. 845,292.

Specification of Letters Patent.

Patented Feb. 26, 1907.

Application filed September 1, 1905. Serial No. 276,665.

*To all whom it may concern:*

Be it known that I, JOHN G. CALLAN, a citizen of the United States, residing at Lynn, county of Essex, State of Massachusetts, have invented certain new and useful Improvements in Governing Mechanism for Turbines, of which the following is a specification.

The present invention has for its object to provide a governing mechanism for turbines of improved construction which is effective and reliable in operation.

My invention is applicable to two more or less distinct methods of governing. The first and simplest comprises the idea of admitting steam or other motive fluid to the turbine in puffs, the duration of which vary in accordance with the load conditions. These puffs do not ordinarily have a definite period of duration, but vary from time to time as the load on the turbine varies. The second method of governing comprises the idea of admitting a column of motive fluid to the turbine and varying its cross-sectional area from time to time as the load changes. This involves the feature of varying the volumn of fluid passing through the machine without, however, varying its velocity by any appreciable amount.

In the accompanying drawings, which illustrate embodiments of my invention.

Figure 1:
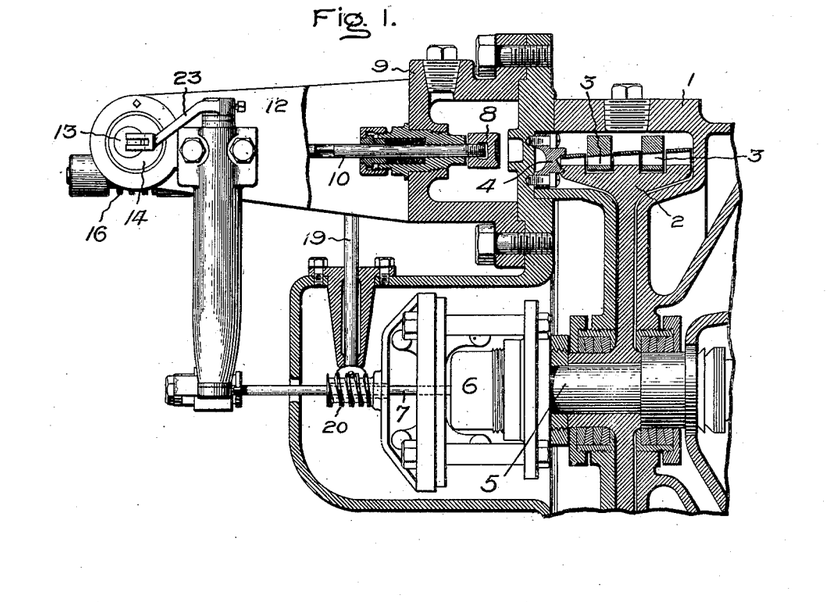
Figure 1 is a partial longitudinal section of an elastic-fluid turbine of the Curtis type.
Figure 2:
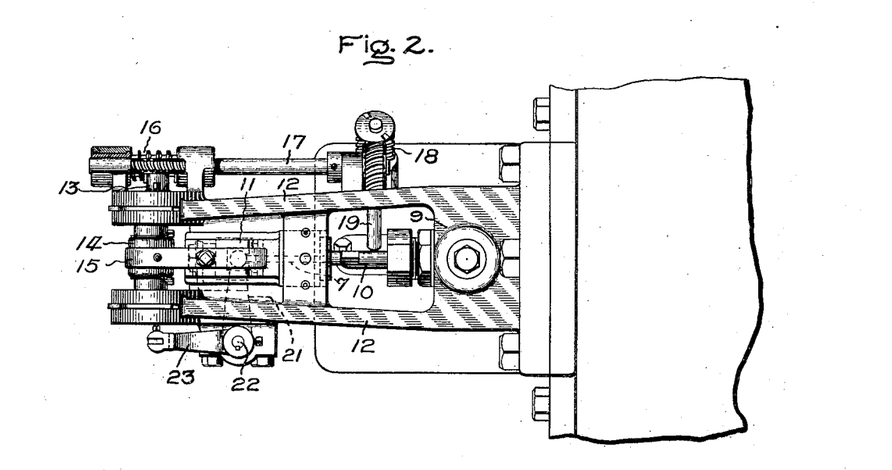
Fig. 2 is a plan view of the same.

Referring to Fig. 1, 1 represents the casing of the turbine, containing a wheel 2, having peripheral rows of wheel-buckets, between which are situated more or less complete rows of intermediate buckets 3. Steam or other elastic fluid is admitted to the turbine by the nozzle 4, which preferably comprises a plurality of closely-associated fluid-discharging passages. These passages may be expanding or non-expanding in character, as desired. The bucket-wheel is mounted upon the main shaft 5, the latter extending through suitable packing in the side walls of the wheel-casing. To the left-hand end of the shaft is attached a speed-responsive device 6, having suitable weights and an opposing spring which coöperate to produce longitudinal movement of the rod 7 when the speed of the turbine changes for any reason. Steam is admitted to the turbine by the puppet-valve 8, the latter being located in a valve-chest 9, that is bolted to the wheel-casing. The valve is attached to a stem 10, that is provided with a rectangular block 11 at its outer end. This block serves as a means for pulling the valve-stem outwardly to open the valve and pushing it inwardly to close the valve. It may be formed integral with the valve-stem or separate therefrom, the latter being the usual arrangement. The valve-chest is provided with two arms 12, that are provided with bearings at their outer ends to receive the shaft 13. The portion of the shaft between the bearings is provided with an eccentric 14, and loosely mounted thereon is a dog 15, which has two acting surfaces, one of which coöperates with the block to open the valve and the other to close it. The means controlling the engagement of the dog both in opening and closing the valve will be described later. The shaft is driven at a relatively low rate of speed by means of worm-gearing 16, horizontal shaft 17, worm-gearing 18, vertical shaft 19, and worm-gearing 20. The vertical shaft 19 and the worm-gearing 20 are driven by a frame that is carried by the speed-responsive device. The rod 7 of the governor extends loosely through the sleeve carrying the driving-worm and is connected at its outer end to a lever 21. This lever is mounted upon the lower end of a vertical shaft 22, and the upper end of said shaft is provided with a lever 23. These levers and shaft transmit motion from the shaft-governor to the dog and cause the latter to move longitudinally on the eccentric by suitable means, which will be described later.

Figure 3:
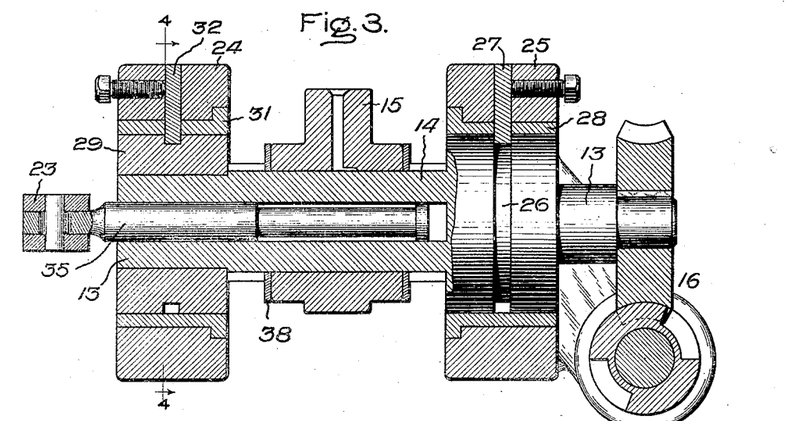
Fig. 3 is a longitudinal sectional view through the dog-actuating eccentric.
Figure 4:
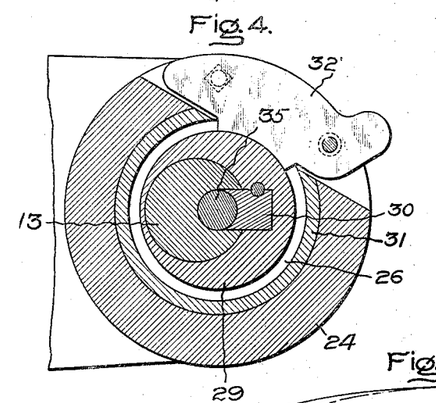
Fig. 4 is a cross-section taken on line 4 4 of Fig. 3.

Referring to Fig. 3, 24 and 25 represent the bearings formed in the ends of the arms 12, leading from the steam-chest. 13 represents the driving-shaft for the eccentric 14. The right-hand end of the shaft 13 is provided with a head or enlargement containing a groove 26, and into this groove extends a pivotally-supported plate 27, that prevents the shaft from moving longitudinally. Surrounding the head or enlargement is a bearing-sleeve 28 of suitable construction. The left-hand end of the shaft is provided with a bushing 29, that is suitably secured thereto by a key 30 and pin, as shown in Fig. 4. The bushing is surrounded by a suitable bearing-sleeve 31, and the bushing and the sleeve are prevented from moving longitudinally by means of the pivotally-supported plate 32.

Figure 6:
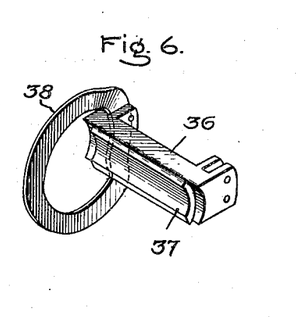
Fig. 6 is a perspective view of the means employed to shift the dog longitudinally on the eccentric in response to changes in load.

The dog 15 is loosely mounted on the eccentric 14 and is normally situated about midway between the bearings 24 and 25. As the eccentric revolves the dog is given a to-and-fro motion in the direction of its length. If it was desired to open and close the valve for each revolution of the shaft 13, this arrangement would be sufficient; but since it is necessary to vary the amount of steam admitted to the turbine as the load changes means have to be provided whereby the period that the valve is open can be varied with respect to the period it is closed. This is accomplished by causing the dog to act on the block 11 of the valve-stem under certain conditions and not under others. To attain these results, a means is provided for moving the dog and the block laterally with respect to each other. The block may move laterally of the dog, or the two parts may move in opposite directions. I find it simplest to move the dog either by sliding it along the eccentric or by bodily moving the eccentric and its driving-shaft. The shaft 13 is bored centrally to receive the rod 35, the latter being connected to the governor-actuated lever 23. The right-hand end of the rod 35 is somewhat reduced in cross-section to receive the shifting device 36, Fig. 6, the latter comprising a sliding block having a projection 37, that partially surrounds the rod 35 and at its ends engages with the shoulder formed thereon. The ends of the block 36 are provided with ears, and riveted thereto are yielding rings 38, that engage the end of the hub of the dog and move it to and fro as the position of the rod 35 changes.

Figure 5:
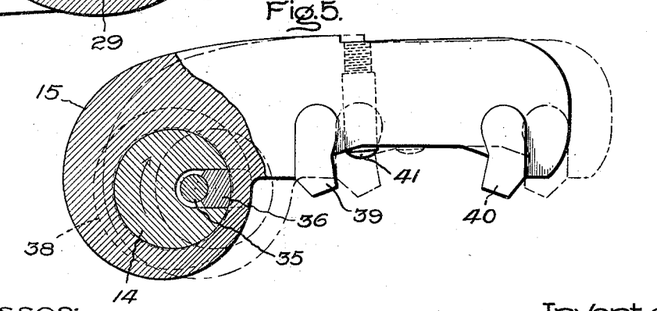
Fig. 5 is a side elevation, partly in section, of a dog for operating the valve.

As shown in Fig. 5, the dog is provided with removable wearing-pieces 39 and 40, that engage, respectively, with the rear and front walls of the block to close and open the valve. The direction of rotation of the eccentric 14 is indicated by the arrow, so that the dog has a longitudinal movement, the extreme position being shown by the dotted lines. The motion of the eccentric tends to hold the dog down against the valve-block. This action is also assisted by gravity and the friction between the rings 38 and the ends of the hub of the dog. In event of this being insufficient, due to any cause, a spring can be employed. As the shaft revolves and moves the dog to and fro the latter tends to strike the block with a hammer-blow, and in order to reduce the blow an adjustable pin 41 is provided, that may be made of fiber or equivalent material. Just above the pin is a screw-threaded opening containing a screw for adjusting it. On the downward stroke of the dog this pin strikes the upper surface of the block and prevents or largely reduces the shock incident thereto.

From the foregoing it will be seen that the dog has two principal motions, first, a longitudinal motion, and, second, a transverse movement, the former being the motion which causes the valve to open or close and the latter the motion caused by changes in position of the shaft-governor to engage or disengage the parts.

Figures 10, 11, 12, 13, 14, 15:
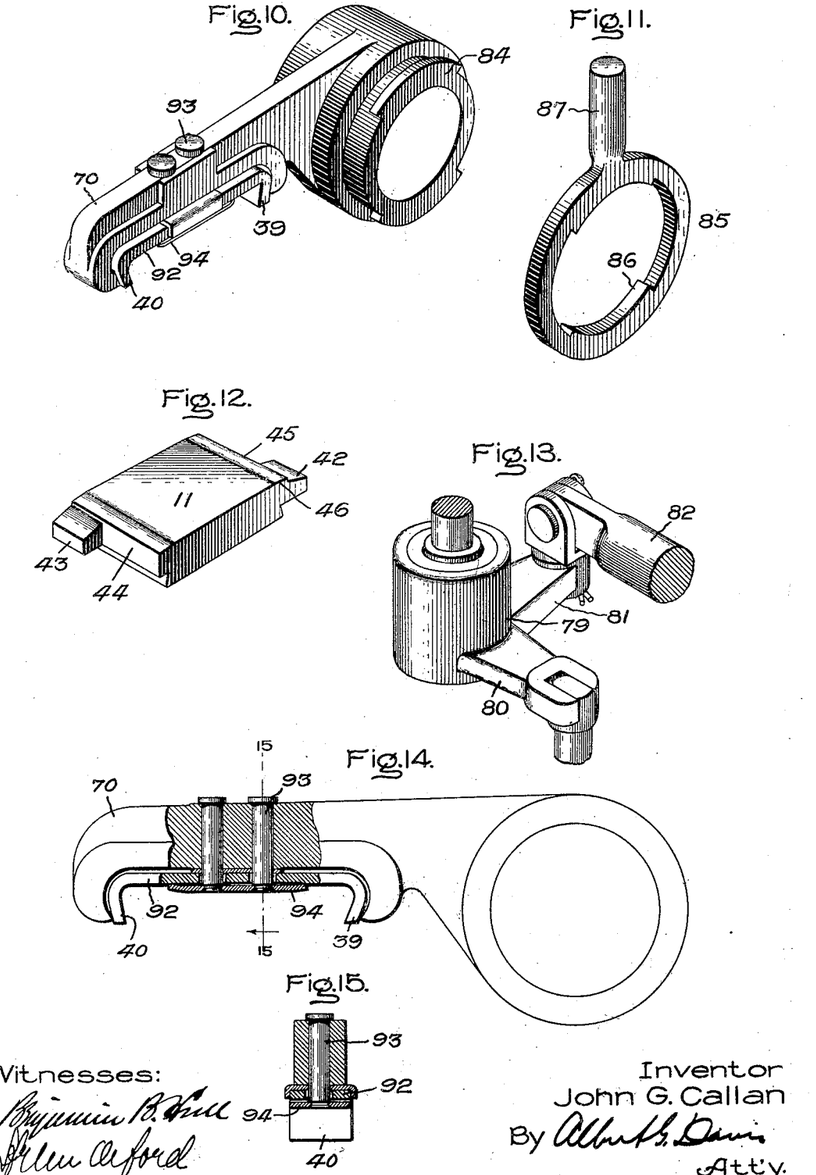
Fig. 10 is a perspective view of one of the dogs for actuating the valve.
Fig. 11 is a perspective view of the means employed to shift the dogs longitudinally on the eccentric.
Fig. 12 is a perspective view of the block carried by the valve-stem for actuating the valve.
Fig. 13 is a perspective view of a bell-crank lever which transmits motion from the shaft-governor to the devices for moving the dogs longitudinally on the eccentric.
Fig. 14 is a view in elevation with certain of the parts in section, showing a dog having a detachable and somewhat resilient wearing-piece.
Fig. 15 is a sectional view taken on line 15 15 of Fig. 14.

The construction of the valve-actuating block 11 is well shown in Fig. 12. It is adapted to be mounted in a cross-head or holder that is attached to the valve-stem, or it may be formed directly on the stem. The block is provided with a forward projection 42 and a rear projection 43, which coöperate with the working surfaces of the dog and control its action on the block. Between the upper surface of these projections and the top of the block are shoulders 44 and 45, and between these shoulders and the top of the block is a slightly-beveled surface 46 to permit the working surfaces on the dog to ride over the block when it is desired to leave the latter in a given position. When the projection 42 engages with the heel 39 of the dog, it acts in a sense as a pivotal point and results in holding the toe 40 out of engagement with the front shoulder 44, while the heel 39 will engage the rear shoulder 45 and close the valve. On the other hand, when the dog is shifted axially to a point where the toe 40 engages the projection 43 and the latter acts in a sense as a pivotal point the heel 39 will be kept out of engagement with the rear shoulder 45, while the toe 40 will engage the front shoulder 44 and open the valve and keep it open until there is a change in load. The distance between the working faces of the toe and heel 39 and 40 of the dog corresponds closely to the distance between the shoulders 44 and 45, the object of this being to positively move the valve over its entire stroke both in opening and closing, only releasing the block after the work has been performed. By reason of this construction any unbalancing of the valve will have no effect. The valve when closed is held on its seat by the unbalanced pressure of the steam against the valve area minus that of the stem. When open, it is held by the unbalanced pressure of the steam on the exposed surfaces. The parts are so arranged that from the time the valve is moved from its seat to the time it is left in the open position by the ultimate disengagement of the dog it is not free to move backward under the influence of the steam acting over the steam area by more than the slight play between the toe and heel of the dog and the shoulders on the block. Similarly, when closing, it is held positively until deposited upon its seat. In other words, when the valve is closed the steam-pressure is utilized to hold it, and when open the steam-pressure is utilized to hold it; but in the intermediate positions the valve is positively controlled by the actuating mechanism. I regard this as an important feature of my invention.

Figure 25:
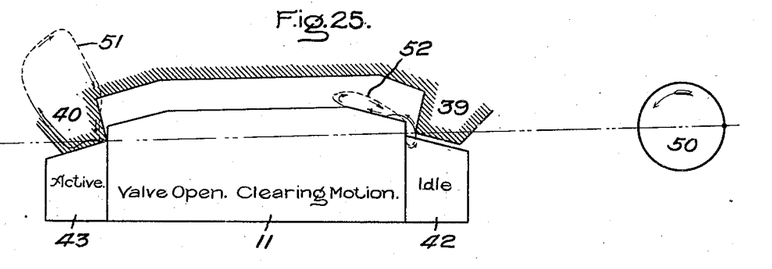
Fig. 25 is a diagrammatic view illustrating the clearing motion of the dog when the valve is open.

In Figs. 25 to 28, inclusive, the movements of the dog and valve-actuating block are illustrated. In Fig. 25 the valve is in the open position—that is to say, the toe 40 has engaged the front shoulder of the block and pulled the valve open. Under these conditions the toe 40 rests on the front projection 43 for a portion of the stroke of the dog and holds the heel 39 out of engagement with the rear projection 42. This means that the shaft 13 will rotate and move the dog to and fro without changing the position of the valve. The heavy black circle 50 at the right indicates the movement of the dog. The dotted line 51 indicates the path that is followed by the acting surface or shoulder of the toe, the arrows showing the direction of movement. The full and dotted line 52 indicates the path that is followed by the acting surface of the heel, the arrows showing the direction of movement. In this position the rear projection 42 is out of alinement with the dog, so that the heel can drop down to form the small dotted loop.

Figure 26:
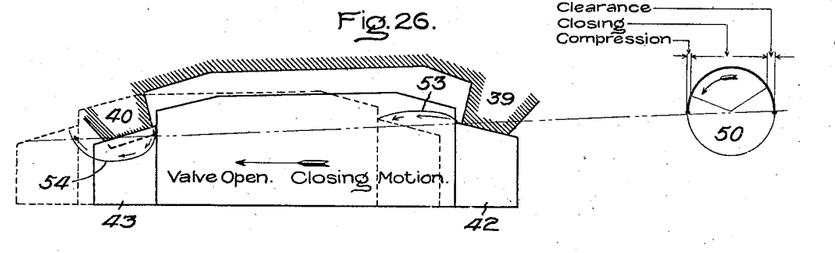
Fig. 26 represents the valve-closing motion of the dog.

In Fig. 26 the valve is shown in the open position and the dog is in the act of closing it—that is to say, the speed-governor has moved the dog axially until the toe 40 no longer registers with the projection 43, while, on the other hand, this movement has moved the dog to a point where the heel and rear projection 42 will engage. As the dog starts forward the first action is to take up the lost motion (indicated at the circle 50 by the word "Clearance.") The heel 39 then engages the rear shoulder 45 and starts the block, and therefore the valve, into motion. This action is indicated at the circle 50 by the word "Closing." After the valve is closed further movement of the dog results in a compression of the spring in the stem for a brief interval, which is represented by the word "Compression" on the circle 50. Further movement of the eccentric starts the dog on its return movement, which is indicated by the light part of the circle. The movement of the heel under this condition is indicated by the full line 53 and that of the toe by the full line 54.

Figure 27:
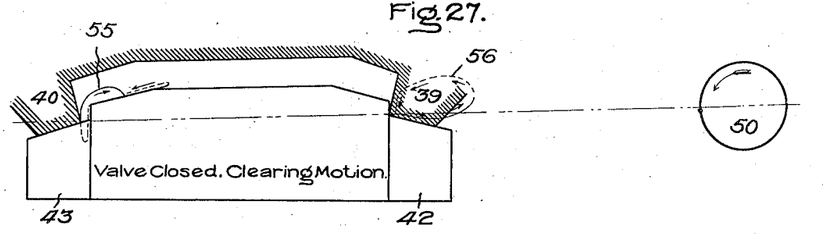
Fig. 27 represents the clearing motion of a dog when its valve is closed.

In Fig. 27 the valve is shown in the closed position, and so long as the parts remain undisturbed by the governor the dog is free to move to and fro without doing any work. The path of the toe under this condition is indicated by the full and dotted line 55 and that of the heel by the full and dotted line 56.

Figure 28:
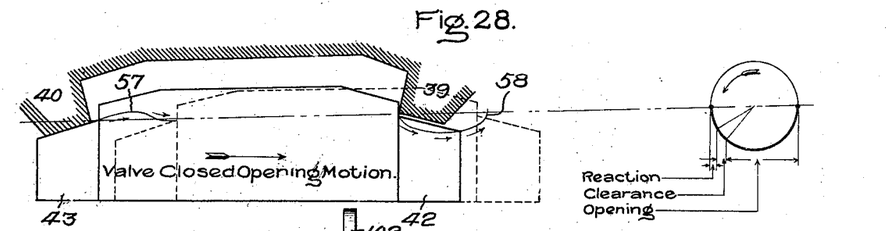
Fig. 28 represents the valve-opening motion of the dog.

In Fig. 28 the valve is shown as closed and the dog in the act of opening the valve. The first movement of the dog is indicated by the word "Reaction" on the circle 50, the next by the word "Clearance," and the final movement by the word "Opening." The full line 57 indicates the path of movement of the toe, and line 58 that of the heel. This completes the cycle of operation, and it is repeated each time the governor changes the relation between the dog and the valve-actuating block. With only a single valve controlled by the mechanism described it is evident that there are times when the valve is wide open and times when it is shut and no steam is flowing. The interval of time that the valve is open is commonly considerably greater than that in which it is closed. It follows, therefore, that the steam or other fluid is admitted in puffs of greater or less duration and that these puffs do not occur in definite periods. They are governed by the load conditions, and the valve will remain open or closed long enough to insure the speed of the bucket-wheel being kept within its normal speed range.

Figure 7:
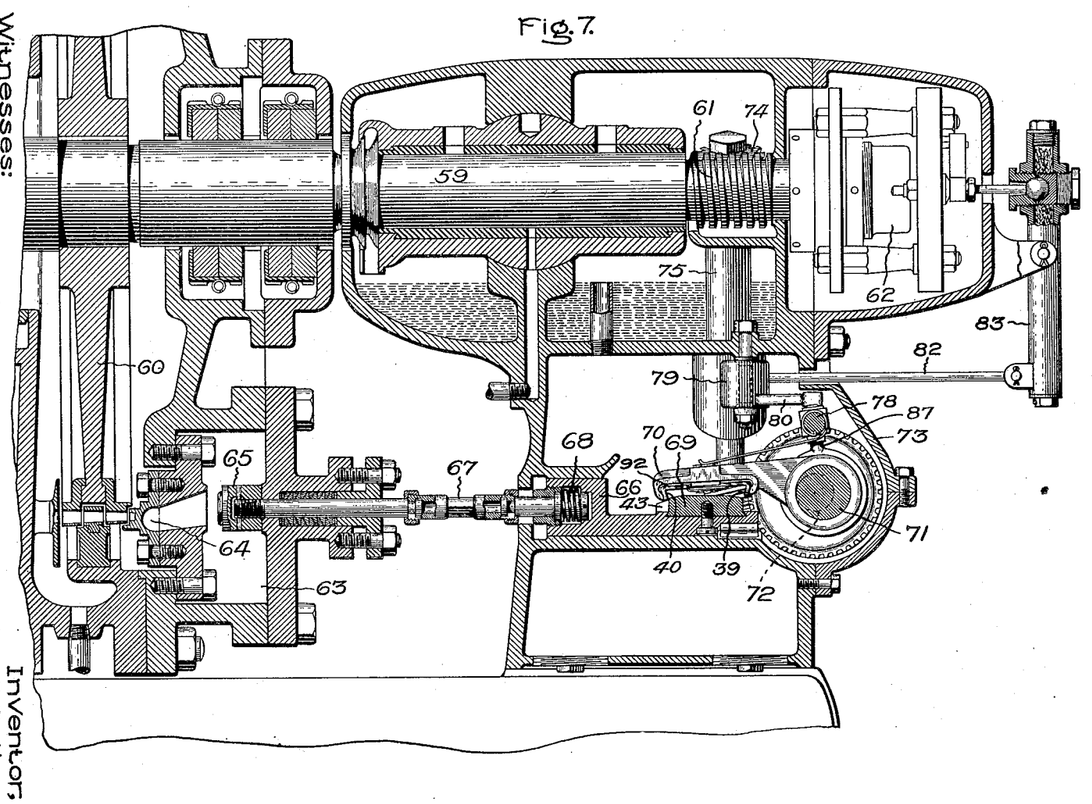
Fig. 7 is a longitudinal section of a Curtis turbine having a plurality of admission-valves each actuated by a separate dog.
Figure 8:
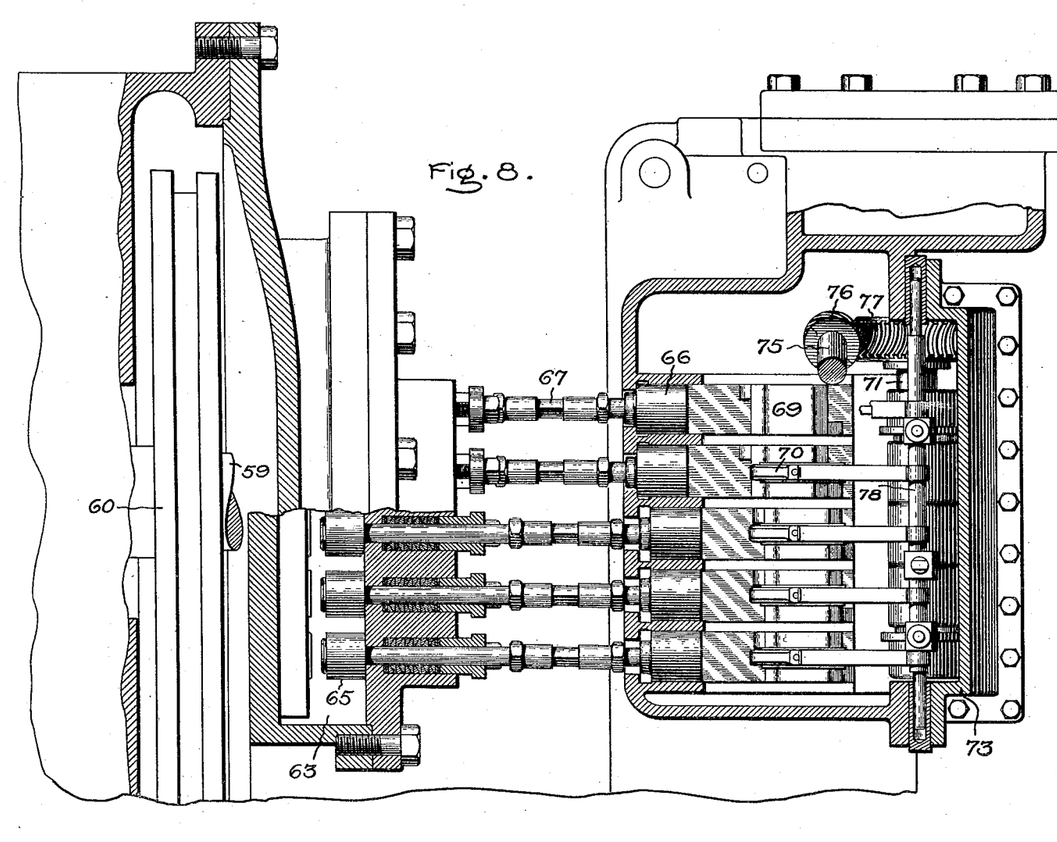
Fig. 8 is a horizontal section of the valve-actuating mechanism.

Referring to Figs. 7 and 8, the invention will be described in connection with a machine wherein a stream of motive fluid is constantly flowing the cross-sectional area of which is increased or decreased as the load conditions call for more or less. 59 represents the main shaft, which carries the bucket-wheel 60 and the worm 61 and the shaft-governor 62. Steam passes from the chest 63 through a plurality of closely-associated nozzle-passages 64 to the wheel-buckets. The regulation is accomplished by a plurality of separate and successively-actuated valves 65. These valves are similar in construction, and each one may control one or more nozzle-passages. In all essential respects the construction and operation of the valves is the same as that previously described. There is this difference, however, that a means is provided to cause the valves to open one after the other and close in like order. Each valve is mounted on a stem that in turn is connected to a sliding cross-head 66 by a coupling 67, the former containing a compression-spring 68. The spring serves as a means to compensate for lack of adjustment, and also as a means to reduce the shock on the dog when it seats the valve. To the cross-head is detachably secured the block 69, that coöperates with the dog 70, the latter being mounted on the eccentric 71, which is driven by the shaft 72. Each dog is normally pressed downward by a long flat spring, one end of which rests on the free end of the dog, and the other end is attached to and carried by the dog-shifting rod 78. Instead of making the stem, cross-head, and block out of separate pieces they can be made in a single piece. Making them of separate pieces has, however, certain advantages, and I prefer to make them that way. The cross-heads, dogs, eccentric, &c., are mounted within a housing 73 in the bearing-standard, and oil is freely admitted thereto from the oil-well below the bearing-sleeve. This insures good lubrication at all times. The cross-heads have ample bearing-surfaces and are suitably guided in their movements. The coupling 67 is provided with slotted ends which slip over enlarged heads on the valve-stem and cross-head and are retained in place by suitable nuts. This construction is of service in assembling and taking down the parts. The driving-shaft 72 for the eccentric receives its motion from a worm-wheel 74, mounted on the vertical inclined shaft 75, the lower end of which is provided with a gear 76, meshing with a gear 77, carried by said driving-shaft 71. The shaft 72 preferably revolves at a considerably-slower speed than the main shaft. In order to shift the dogs axially on the eccentrics, (it being understood that an eccentric is provided for each dog,) a rod 78 is provided, which extends parallel with the axes of the eccentrics and is moved longitudinally by a bell-crank lever 79, Figs. 7 and 13. The lever is supported in place by a stud carried by the wall separating the oil-well from the housing 73. The arm 80 of the lever is connected by a pin-and-slot connection with the horizontal rod 78, and the arm 81 is connected by rod 82 with the lower end of the governor-actuated lever 83. The upper end of the lever 83 is connected by a suitable rod with the movable part of the shaft-governor. As the governor moves, due to change in speed, the bell-crank lever 79 is rocked in one direction or the other and in turn moves the horizontal rod 78.

The means for transmitting the longitudinal movement of the rod 78 to the dogs will now be considered. The end dogs are provided with hubs of somewhat-reduced size, Fig. 10, and each of these hubs is provided with a segmental radial flange 84. In Fig. 11 is shown a ring 85, which is adapted to be slipped over the hub of the dog and given a quarter-turn, which causes the internal segmental flange 86 to engage the external segmental flange 84 of the dog. Extending upwardly from each ring is a cylindrical projection 87, that fits into a cylindrical orifice formed in the rod 78. As the rod is moved axially by the governor these rings will move the dogs along the eccentrics, (for convenience the eccentrics may be made in a single piece,) which movement shifts the heels and toes of the dogs with respect to the projections on the blocks 69 and causes the valve to open and close, as the load conditions demand.

Figure 16:
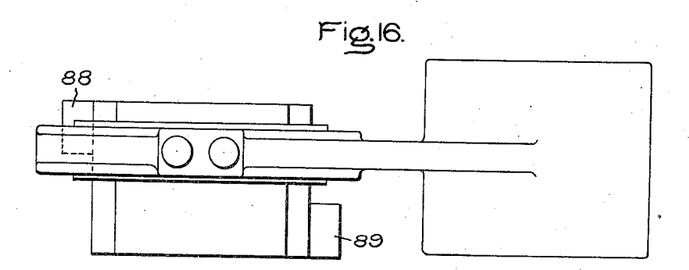
Fig. 16 is a plan view showing the relation between a dog and the block coöperating therewith, the dog and block occupying one of the extreme positions.
Figure 17:
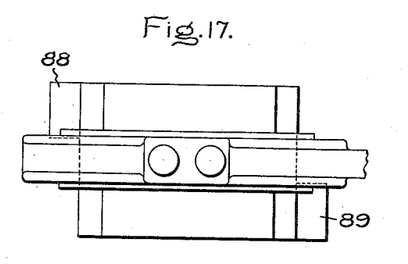
Fig. 17 is a similar view with the dog occupying a mid-position with respect to the block.
Figure 18:
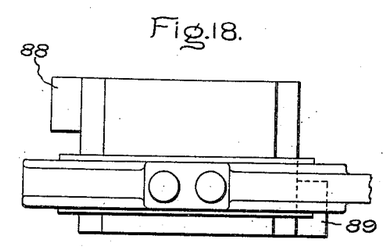
Fig. 18 is a similar view with the dog occupying the other of its extreme positions.

In Figs. 16, 17, and 18 the three principal positions of the dogs and valve-actuative blocks are shown. In Fig. 16 the forward projection 88 is active and is holding the heel of the dog out of engagement with the block. In Fig. 17 the dog is in the mid-position, and the valve may open and close once for each revolution of the shaft 72, depending on the width of the heel and toe of the dog. By making the width of the heel and toe of the dog slightly greater than the distance between planes coinciding with the adjacent walls of the front and rear projections on the block the dog can move to and fro without affecting the valve. A substantial movement of the dog in an axial direction would of course bring it into position to move the valve. By making the width of the heel and toe less than the distance between planes coinciding with the adjacent walls of the projections on the block the valves open and close coincidently with the to-and-fro movements of the dog. Under certain conditions this arrangement will be found desirable. With this arrangement of parts one or more of the valves will normally be open, one or more normally closed, and at least one valve will be opening and closing with each stroke of the dog. In Fig. 18 the heel of the dog is in engagement with the rear projection 89, and the forward movement of the dog will close the valve.

Figure 19:
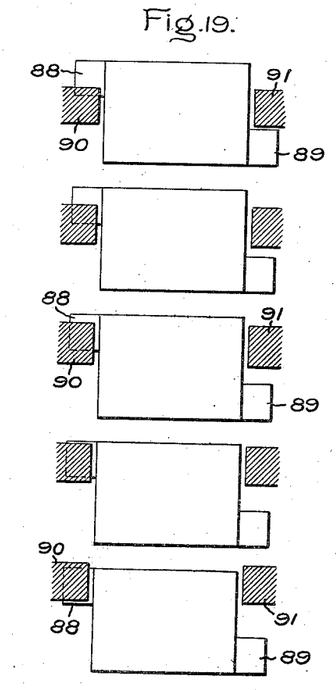
Fig. 19 is a diagrammatic view illustrating the relation between the several dogs and their coöperating blocks, whereby the successive actuation of the valve is obtained.
Figure 20:
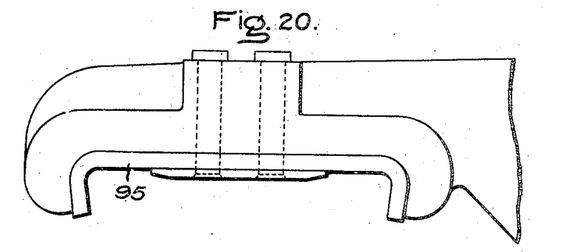
Fig. 20 is a partial view in elevation of the end of a dog, showing a detachable wearing-piece, the spring feature being omitted.
Figure 21:
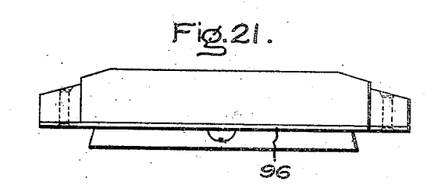
Fig. 21 is a view in side elevation of a block made up in pieces with spring-supports for the projections that are struck by the dog.
Figure 22:
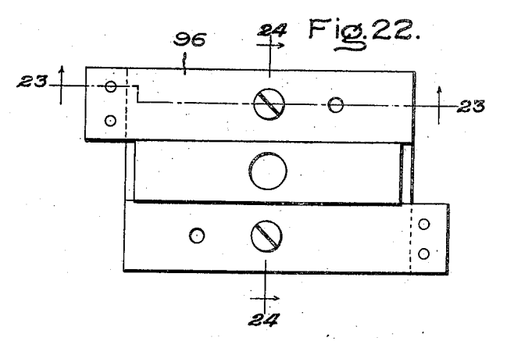
Fig. 22 is a plan view of the block as viewed from underneath.
Figure 23:
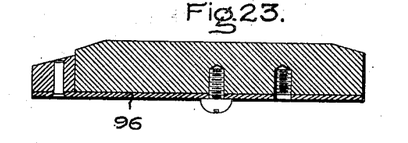
Fig. 23 is a longitudinal section of the block, taken on line 23 23 of Fig. 22.
Figure 24:
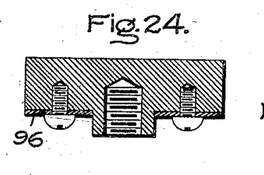
Fig. 24 is a cross-section taken on line 24 24 of Fig. 22.

In Fig. 19 I have illustrated, on an enlarged scale and in a diagrammatic manner, the position of the dogs 70 and the valve-actuating blocks 69. As shown, all of the valves are in the open position. Moving the dogs in the direction indicated by the arrow will cause the toe 90 to pass out of engagement with the forward projection 88 of the upper block and the heel 91 into engagement with the rear projection 89 and close the valve. Owing to the overlap of the toes of the other dogs and the forward projections on the blocks, this movement has no effect on the remaining valves. Further movement of the dogs in the direction of the arrow will cause the second valve to close, then the third, and so on. Movement of the dogs in the reverse direction will cause the valves to open one after the other. If it be desired, the dogs and projections can be so related that two or more valves will open and close as a unit. The action of each of the dogs is the same as that described in connection with Figs. 25 to 28, inclusive, and further description is unnecessary. In Fig. 8 three of the valves are open and two closed.

In Fig. 14 is shown a slight modification of the means employed to lessen the effect of the hammer-blow of the dogs. The general shape of the dog is the same as before. Attached to the under side of the dog by suitable rivets is a flat plate 92, having downturned ends and made of some resilient material. One of the ends forms the toe and the other the heel of the dog. Between the side portions of the plate 92 and the body of the dog is a small space, which permits the plate to yield slightly when the toe or heel strikes the projections on the valve-actuating block. The rivets 93 pass freely through the plate and are secured to the spring 94 on the under side of the plate 92.

In Figs. 20 to 24 is shown a further modification of the same idea. In these figures the dog is constructed as before with a removable wearing-plate 95, that is secured in place by rivets. The projections which coöperate with the toe and heel portions of the dog instead of being formed integral with the block are supported by flat spring-plates 96, attached to the under side of block by screws or other means. The projections are riveted or otherwise secured to the plates. The projections, block, and wearing parts on the dog may be suitably hardened.

Figure 9:
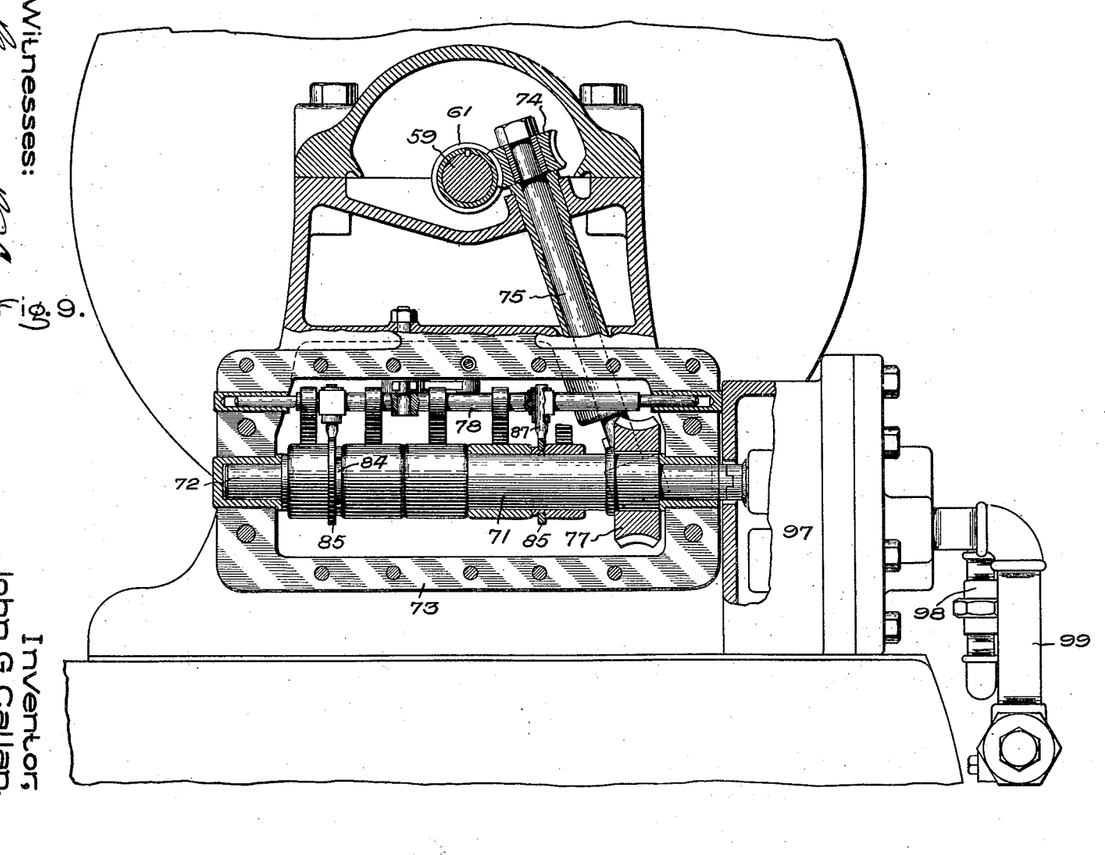
Fig. 9 is a detail view, partly in section, showing the eccentric and the driving connection between it and the main shaft.

In Fig. 9 the shaft 71 in addition to driving the eccentrics also drives a lubricating-pump located within the housing 97. Connected to the pump is a discharge-pipe 98 and a return-pipe 99.

Figure 29:
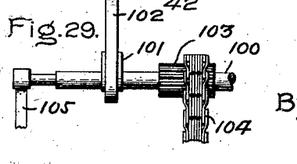
Fig. 29 shows a modification in which the shaft and eccentric are shifted bodily.

Instead of shifting the dog axially on the eccentric for the purpose of opening and closing the valves, the shaft, eccentrics, and dogs can be shifted bodily by a suitable means connected to the governor. Such an arrangement is shown in Fig. 29, wherein 100 is the shaft and 101 an eccentric for driving the dog 102. On one end of the shaft is a spur-gear 103, having teeth of sufficient length to permit of longitudinal movement without causing disengagement of the driving-chain 104. On the opposite end of the shaft is a rod 105, which is adapted to be connected to a governor. The operation in all essential respects is the same as previously described. While only one dog is shown for convenience in illustration, I may employ as many as are desired, the said dogs arranged to give successive actuation of the valves.

Figure 30:
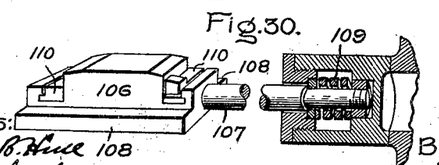
Fig. 30 shows an arrangement wherein the valve-actuating block is made integral with the valve-stem.

In Fig. 30 is shown an arrangement wherein the valve-actuating block 106 is forged on the end of the valve-stem 107. The block is provided with guides 108, that engage with suitable guide-surfaces on the support that carries the mechanism. Between the stem and the valve and located within the body of the valve is a compression-spring 109, which acts as a compensating means. The ends of the block are slotted transversely, and mounted in the slots are detachable pieces 110, having projections thereon which form the devices for controlling the action of the dogs in the blocks. These pieces are slotted longitudinally, so as to yield slightly when the toe and heel portions of the dog strike them.

In the assembly drawings the valve mechanism has been shown in connection with the admission-valves; but it is obvious that the same mechanism can be used for operating stage-valves which are under the control of the same or a separate governor. The same driving-shaft can be used for both the admission valve or valves or the stage valve or valves. The opening and closing of the stage-valves can be simultaneous with that of the admission-valves, or they may be arranged by properly setting the parts to open and close between the opening and closing of said valves. In this respect the arrangement shown is exceedingly flexible.

In accordance with the provisions of the patent statutes I have described the principle of operation of my invention, together with the apparatus which I now consider to represent the best embodiment thereof; but I desire to have it understood that the apparatus shown is only illustrative and that the invention can be carried out by other means.

What I claim as new, and desire to secure by Letters Patent of the United States, is—

1. In a governing mechanism, the combination of a regulator for controlling the passage of energy through the apparatus to be governed, a means for actuating the regulator, and a device responsive to load changes which shifts the said means and regulator laterally with respect to each other to cause the said means to open or close the regulator.

2. In a governing mechanism, the combination of a regulator for controlling the passage of energy through the apparatus to be governed, a means which is constantly in motion and in a normal given plane for actuating the regulator, and a device responsive to load changes which automatically shifts the said means and regulator laterally with respect to each other to cause the said means to engage the regulator in a manner to open and close it to meet the demand for energy.

3. In a governing mechanism, the combination of a valve for controlling the passage of fluid, a means which is constantly in motion for opening and closing the valve, and a device for shifting the relative position of the valve and means prior to actuating the valve as the demand for fluid changes.

4. In a governing mechanism, the combination of a valve for controlling the passage of fluid, a means normally having a movement in a given plane for opening and closing the valve, and a load-responsive device for moving the said means transversely to its normal plane in order to modify its effect on the valve.

5. In a governing mechanism, the combination of a regulator, a means which is constantly moving to and fro in a given plane for operating the regulator, and a device for shifting the said means transversely to its normal plane without interrupting its movements when it is desired to modify its action on the regulator.

6. In a governing mechanism, the combination of a regulator, a dog having a constant to-and-fro motion for actuating the regulator, and a means for shifting the dog to one side of a given position for moving the regulator in one direction and for shifting it to the other side of said position for moving the regulator in the opposite direction.

7. In a governing mechanism, the combination of a regulator, a dog, a driving means for the dog which imparts to it a to-and-fro motion, and a means for shifting the dog to one side of a given position without interfering with its normal movements for moving the regulator in one direction, and for shifting it to the other side of said position for moving the regulator in the opposite direction.

8. In a governing mechanism, the combination of a controlling-valve, a device for actuating the valve, an eccentric on which the device is mounted for moving it to and fro, a driving means for the eccentric, and a means responsive to load conditions for causing the device to move the valve.

9. In a governing mechanism, the combination of a controlling-valve, a device for actuating the valve, an eccentric for moving the device to and fro, a driving means for the eccentric, a speed-responsive device, and a means actuated by the speed-responsive device for shifting the valve-actuating device axially with respect to the eccentric.

10. In a governing mechanism, the combination of a controlling-valve, a dog for actuating the valve, an eccentric for moving the dog to and fro. and a speed-responsive device for sliding the dog along the eccentric in one direction to open the valve and in the opposite direction to close the valve.

11. In a governing mechanism, the combination of a controlling-valve, an actuator connected to and moving with the valve, a device which has a constant movement and engages one part of the actuator to move the valve in one direction, and another part of the actuator to move it in the opposite direction, and a means responsive to load conditions for shifting the device laterally so that it will engage one part of the actuator or the other depending upon the load requirements.

12. In a governing mechanism, the combination of a valve, a stem therefor, a device which acts on the stem and opens the valve when moved in one direction and closes it when moved in the other, and a means moving with the stem which controls the effective action of the device on the valve.

13. In a governing mechanism, the combination of a regulator for controlling the passage of energy through the apparatus to be governed, a means for actuating the regulator which has a to-and-fro movement, a mechanism for shifting the regulator and means laterally with respect to each other as the load conditions change, and a device moving with the regulator for determining the effective action of the said means thereon.

14. In a governing mechanism, the combination of a regulator for controlling the passage of energy through the apparatus to be governed, a means which opens the regulator when moved in one direction and closes it when moved in the other, mechanism responding to load changes for shifting the regulator and means with respect to each other, and a device which prevents the said means from acting on the regulator after it has moved it until a change occurs in the load conditions.

15. In a governing mechanism, the combination of a plurality of regulators, an actuator for each regulator which is constantly moving to and fro in a plane, and a load-responsive device which shifts one or more of the actuators and regulators with respect to each other to cause the actuator or actuators to open or close one or more regulators.

16. In a governing mechanism, the combination of a plurality of controlling-valves, an actuator for each valve that opens it on one stroke and closes it on the other, and a load-responsive device which shifts the actuators laterally from their normal planes of motion and causes them to successively open and close the valves as the demand for fluid changes.

17. In a governing mechanism, the combination of a plurality of controlling-valves, an actuator for each valve, a driving means common to the actuators, and a load-responsive device which shifts the actuators laterally and causes them to open and close the valves as the demand for fluid changes.

18. In a governing mechanism, the combination of a plurality of controlling-valves, an actuator for each valve, an eccentric for each actuator, a driving means common to the eccentrics, a load-responsive device which shifts the actuators laterally without interfering with their movements and causes them to open and close the valves as the demand for fluid changes.

19. In a governing mechanism, the combination of a plurality of controlling-valves, an actuator for each valve, a driving means common to the actuators, a device moving with each of the valves which determines the action of the actuator thereon, and a load-responsive device which shifts the actuators laterally to cause them to open or close the valves as the demand for fluid changes.

20. In a governing mechanism, the combination of a plurality of controlling-valves, a cross-head for each valve, an actuator for each valve that acts directly on the cross-head, a driving means common to the actuators, and a load-responsive device which successively shifts the actuators into or out of operative engagement with the cross-heads as the demand for fluid changes.

21. In a governing mechanism, the combination of a plurality of controlling-valves arranged in a row, an actuator for each valve, a driving-shaft which passes through and is common to the actuators and imparts a longitudinal reciprocating motion thereto, and a means for causing the actuators to engage or disengage the valves as the demand for the fluid changes.

22. In a governing mechanism for turbines, the combination of a bucket-wheel, a shaft therefor, a valve controlling the passage of fluid through the bucket-wheel, an actuator which opens the valve when moved in one direction, and closes it when moved in the opposite, a driving-shaft for the actuator, a connection for transmitting motion between the shafts, and a speed-responsive device driven by the wheel-shaft that shifts the actuator and valve with respect to each other to cause the actuator to move the valve as the demand for fluid changes.

23. In a governing mechanism, the combination of a plurality of controlling-valves, an actuator for each valve, which has a constant to-and-fro movement, an eccentric for moving each actuator, a driving-shaft which is common to the eccentrics, a rod extending longitudinally of the eccentrics which shifts the actuators laterally, and a speed-governor for moving the rod as the demand for fluid changes.

24. In a governing mechanism, the combination of a plurality of controlling-valves, a dog for actuating each valve that has a toe and a heel piece, a means for constantly imparting a longitudinal to-and-fro movement to the dog, a device on each valve which determines whether the toe or heel piece shall engage it, and a speed-responsive means that moves the dogs to cause them to open or close the valves.

25. In a governing mechanism, the combination of a regulator, an actuating-block attached to and moving with the regulator, a dog which has a toe and a heel piece and is constantly in motion, a driving-shaft for the dog, projections on the block which cooperate with the toe and heel pieces to prevent the dog from moving the regulator, and a means for adjusting the relative positions of the block and dog so that that latter can move the regulator in the required direction.

26. In a governing mechanism, the combination of a regulator, a constantly-moving actuator, means for transmitting motion from the actuator to the regulator when it is desired to move it, and means which bodily moves the actuator laterally to a position where it will move the regulator and thereafter continue its movement without affecting the regulator until a change in operating conditions occurs.

27. In a governing mechanism, the combination of a regulator, an actuator which has a constant to-and-fro motion, a block which transmits the movements of the actuator to the regulator when it is desired to move it, and means which bodily move the actuator laterally to a position where it will move the regulator and thereafter continue its movements without affecting the regulator until a change in operating conditions exists.

28. In a governing mechanism, the combination of an unbalanced regulating-valve which is held in its open and closed positions by fluid acting on its surfaces, with a means responsive to load changes which engages the valve when in a position of rest, then positively moves it to a new position and at the same time prevents the valve from operating due to its unbalanced condition and finally disengages the valve until a change in the load conditions occurs.

29. A governing mechanism, comprising an unbalanced regulating-valve which is held in its open and closed positions by fluid-pressure, an actuating means which first engages the valve, then positively moves it toward or away from its seat and at the same time prevents the same from moving independently due to its unbalanced condition, and a load-responsive device which controls the effective action of the actuating means on the regulator.

30. A governing mechanism, comprising a plurality of unbalanced regulating-valves which are held in their positions by fluid-pressure, a separate actuator for each valve that first engages it, then positively moves it toward or away from its seat and prevents the same from jumping due to its unbalanced condition, and a load-responsive device which causes the actuators to successively operate the valves both in opening and closing.

31. In a governing mechanism, the combination of a regulator, an actuator that is normally free to move to and fro and which positively engages the regulator both to open and close it, a resilient means for cushioning the actuator as it strikes the regulator both in opening and closing, and means moving the regulator which engages the actuator and determine its effect thereon.

32. In a governing mechanism, the combination of a regulator, a block for actuating it comprising shoulders and projections, a dog which engages the shoulders and moves the regulator in one direction or the other as the operating conditions demand, the said projections acting on the dog to hold it out of engagement with the shoulders or to permit it to engage them as the operating conditions demand.

33. In a governing mechanism, the combination of a regulator, a block for actuating it comprising shoulders and spring-supported projections, a dog having toe and heel pieces adapted to engage the shoulders, the said projections acting to control the effective action of the dog on the block and also to cushion the blows of the dog as it strikes the block.

34. In a governing mechanism, the combination of a valve, a dog having a toe-piece that positively moves the valve in one direction and a heel-piece that positively moves it in the opposite direction, projections moving with the valve which alternately engage the dog to cause it to perform its work, and means for shifting the dog laterally to engage one projection or the other.

35. In a governing mechanism, the combination of a plurality of regulating-valves, one or more of which are normally open and one or more normally closed, and one of which is opening and closing at frequent intervals for regulating purposes, longitudinally-movable dogs for moving the valves that directly engage the same, and a means for shifting the dogs laterally to cause them to engage and move one or more valves as the load increases or decreases.

36. In a governing mechanism, the combination of a regulator, a dog having a to-and-fro motion for actuating the regulator, an eccentric upon which one end of the dog is loosely mounted, and a means normally tending to cause the free end of the dog to engage and move the regulator.

37. In a governing mechanism, the combination of a regulator, a device for actuating the regulator, and a means for shifting the device to a position where it opens the regulator and to a different position to close it.

In witness whereof I have hereunto set my hand this 26th day of August, 1905.

JOHN G. CALLAN.

Witnesses:
JOHN A. MCMANUS, Jr.,
HENRY O. WESTENDARP